United States Patent [19]

Kiersarsky et al.

[11] Patent Number: 4,541,980
[45] Date of Patent: Sep. 17, 1985

[54] METHODS OF PRODUCING PLASTIC-COATED METALLIC MEMBERS

[75] Inventors: Albert S. Kiersarsky, Howard County; Earl S. Sauer, Baltimore County; William C. Vesperman, Howard County; Max K. Wilson, Baltimore, all of Md.

[73] Assignee: AT&T Technologies, Inc., Berkeley Heights, N.J.

[21] Appl. No.: 569,532

[22] Filed: Jan. 9, 1984

[51] Int. Cl.$^4$ .......................... B05D 1/24; B05D 1/26; B05D 1/36; B05D 5/02
[52] U.S. Cl. ........................... 264/174; 427/27; 427/29; 427/32; 427/33; 427/197; 427/203; 427/185; 427/409; 427/120
[58] Field of Search ................. 427/27, 29, 32, 33, 427/197, 203, 185, 409, 120; 264/174

[56] References Cited

U.S. PATENT DOCUMENTS

| | | | |
|---|---|---|---|
| 2,971,242 | 2/1961 | Doleman et al. | 427/185 |
| 3,197,324 | 7/1965 | Brooks | 427/185 |
| 3,828,729 | 8/1974 | Goodridge | 118/634 |
| 3,916,826 | 11/1975 | Knudsen | 118/404 |
| 3,941,866 | 3/1975 | Ingraham | 264/174 |
| 4,030,446 | 6/1977 | Karr | 118/654 |
| 4,237,186 | 12/1980 | Ingraham | 264/174 |
| 4,297,386 | 10/1981 | Gillette | 427/27 |
| 4,368,214 | 1/1983 | Gillette | 427/185 |

OTHER PUBLICATIONS

Hansen et al., Polymer Letters, vol. 4, pp. 203-209, Mar. 1966.

*Primary Examiner*—Richard Bueker
*Attorney, Agent, or Firm*—Don P. Bush

[57] ABSTRACT

A priorly used drop wire having a single layer of PVC insulating compound, containing a relatively-expensive epoxy additive, extruded over a spaced pair of conductors, having relatively rough surfaces, is replaced with drop wire having less-costly, relatively-smooth, drawn, conductors onto which spaced, unplasticized particles of PVC resin are coated and the portions of the particles contacting the surfaces of the conductors are melted, caused to undergo controlled degradation and adhere to the surface of the conductor, and thus form a relatively-stable, texturized, discontinuous coating of adhesion sites on the surfaces of the conductors with interdispersed portions of the surfaces being exposed.

Over the precoated conductors, a composition containing a plasticized PVC resin may be extruded to form an insulating covering having a relatively-stable, controlled-degree of adhesion to the adhesion sites and the interdispersed, exposed surfaces of the conductors.

A precoated metallic member having a texturized, discontinuous coating of degradated, unplasticized plastic adhesion sites formed on selected portions of the surface of the metallic member may be used as an article of manufacture onto which an adherent coating of compound containing plasticized plastic may be molded to make other items such as plastic-coated fencing material or aluminum siding.

11 Claims, 3 Drawing Figures

METHODS OF PRODUCING PLASTIC-COATED METALLIC MEMBERS

BACKGROUND OF THE INVENTION

1. Field of the Invention

This invention relates to methods of forming relatively-stable, texturized, discontinuous coating of adhesion sites on the surfaces of metallic members for use in the manufacture of plastic-coated metallic members, and articles produced thereby; and, more particularly, to methods of applying a coating of unplasticized plastic particles onto at least a portion of a metallic member and causing controlled melting and degradation of at least the portions of the particles contacting the surface of the member to form relatively-stable adhesion sites on the metallic member which may be used to place a plastic coating on the particle-coated portion of the metallic member having a controlled adhesion to the adhesion sites and to exposed, interdisposed areas of the surface on the metallic member.

2. Prior Art and Technical Consideration

Insulated, electrical conductors, such as those employed in telephone installations, are often subjected to outdoor use or to conditions that expose the insulation to the deteriorating influences of light, weather, and possibly abrasion. With respect to telephone drop wire, which is the familiar black overhead wire comprised of two, parallel, spaced conductors that brings telephone service from the telephone pole to the home, it was customary to enclose the conductors with an extruded insulating covering.

Although such protective insulative coverings have been in widespread use for many years and have proven satisfactory from most standpoints, there was a long felt desire to develop an alternative, less expensive, insulation. Such an alternative was developed and is claimed in E. J. George et al. Pat. 3,935,369 which issued on Jan. 22, 1976 and is incorporated by reference herein.

As disclosed in that patent, any alternative covering must have specific properties to fill the requirements of this type of wire. For example, it is important that the plastic-covered drop wire have an insulating material which has adequate properties to withstand exposure to the elements, as well as adequate low temperature flexibility, impact-resistance, and abrasion-resistance. Portions of the wire adjacent to each end thereof are inserted into a metallic clamp. One of the clamps is attached to a subscriber's premises and the other one to a telephone pole prior to the electrical connection of the drop wire to wiring run between the insides of the subscriber's premises and aerial distribution cables, respectively.

At both the subscriber end and the pole end of the drop wire, the retention of the drop wire in engagement with the clamps is effected by reactive forces exerted by the clamps on the insulation. If this is not transferred from the insulation to the conductors by the adhesion herebetween, the insulation may pull from the conductors and the entire weight of the drop wire would be held by the terminal connections. This may very well lead to a disconnection of the circuit. On the other hand, if the adhesion between the composition and the conductors is too great, there may be problems in attempting to strip the covering from the conductors. Too great an adhesion could require an excessive scraping activity that could remove some of the metallic material from the surface portions of the conductors thereby increasing the electrical resistance and changing the conductivity thereof. Excessive scraping also unduly reduces the cross-sectional area of the wire or knicks it thereby reducing the strength properties of the wire to the detriment of its weight-supporting capability.

SUMMARY OF THE INVENTION

In accordance with the principles of the invention, methods were developed for covering metallic members with a plastic composition, not containing a relatively-expensive adhesive additive to the composition, to the metallic strand in which the adhesion of the composition to the metallic strand material is controlled and within a specific range of values.

Such methods for covering a metallic strand with a plastic composition, includes the steps of applying a discontinuous application of particles of unplasticized polyvinyl chloride (PVC) resin over approximately 50 percent of the surface of the metallic strand preheated to a temperature within a specific range of temperatures from 650° F. to 675° F. to cause the portions of the unplasticized PVC resin particle contacting the strand to undergo controlled degradation and adhere to the metallic strand to produce a texturized, discontinuous coating of partially-degradated particles of unplasticized PVC resin on the metallic strand, covering the discontinuously-coated, metallic strand with a composition which includes a plasticized polyvinyl chloride (PVC) resin, a metallic stabilizer, a filler system, a flame retardant constituent and a carbon black constituent and controlling the adhesion of the composition to the partially degradated particles of the discontinuous coating and the interdispersed exposed surfaces of the metallic strand to within a specific range of values.

It was found necessary and desirable to use a conductor which was less costly and easier to make than the electroplated conductor disclosed in the E. J. George et. al. patent, this was accomplished by providing a drawn, copper-clad, steel-cored strand which has a relatively smooth surface as compared to the electroformed surface on the conductor disclosed in the E. J. George et al. patent.

It was found that by utilizing the methods claimed in the E. J. George et al. patent and the smoother-surfaced, drawn, copper-clad conductor it was not possible to consistently obtain the required adhesion levels between the smoother surfaced conductors and the insulating covering. The use of the prior art process taught in that patent, in conjunction with the new drawn, copper-clad conductors, resulted in products being made having erratic adhesion properties.

With the use of the relatively smooth surfaced conductor it was difficult if not impossible to consistently obtain the required adhesion levels when using the prior art processes. Initially, satisfactory adhesion values were found to uncharacteristically deteriorate after room temperature aging. It was also found that drop wire passing the initial adhesion requirements unexpectedly failed the static load test even after aging at room temperature for only 5 days.

It was found that by forming a texturized, discontinuous coating of adhesion sites by using the powdered-plastic, pre-coating process disclosed and claimed herein, drop wire with consistent adhesion values within specified limits throughout the entire length of the drop wire could be obtained on a controlled basis;

even when using the relatively-smooth, drawn, copper-clad conductors which may have residual traces of wire-drawing lubricants thereon.

BRIEF DESCRIPTION OF THE DRAWINGS

Various features of the invention will be more readily understood from the following detailed description, when read in conjunction with the accompanying drawings, in which.

DETAILED DESCRIPTION

Figure 1:
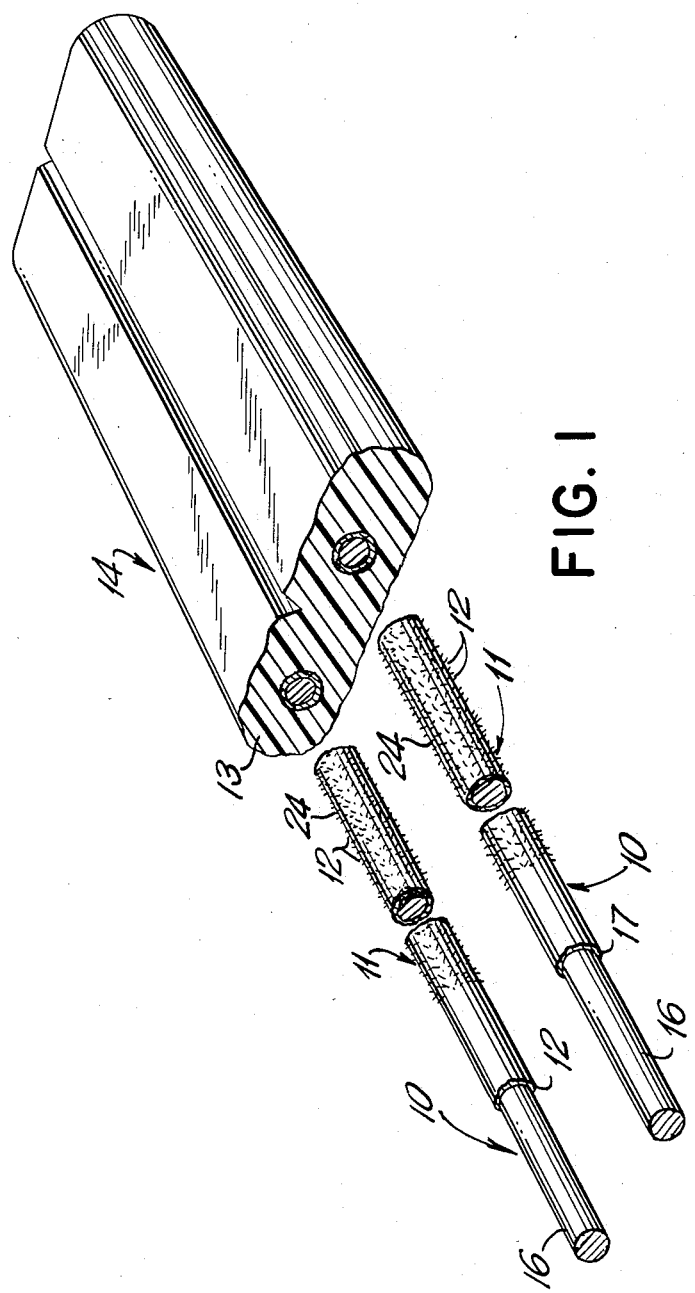
FIG. 1 is fragmentary, schematic, perspective view of a drop wire manufactured in accordance with the principles of the present invention with portions broken away to illustrate the drop wire in various stages in the operation.

Two strand conductors, designated generally by the numerals 10—10, on which a texturized, discontinuous coating, designated generally by the numeral 11, of partially-degradated, unplasticized PVC resin particles 12—12 is applied over approximately 50 percent of the surface area of the conductors 10—10 and over which a common insulating covering 13 is extruded to form a drop wire, designated generally by the numeral 14. The conductors 10—10 are formed of steel cores 16—16 over which drawn, copper cladding 17—17 is formed. The diameter of the steel core 16 is approximately 0.033 inch and the diameter of the copper-clad conductor 10 is approximately 0.038 inch.

A typical overhead transmission line or drop wire for connecting the subscriber's premises to aerial distribution cables (not shown) is disclosed in accordance with the E. J. George et al patent. In order to provide the drop wire with strength, the high tensile strength steel core 16 is used. According to recognized electrical principles, maximum conductivity should exist in the surface portion of an overhead drop wire. To insure such conductivity, the copper cladding 17 is applied over the steel core 16. The copper-clad, steel-cored conductor 10 is passed through a lubricated wire-drawing die to reduce the overall diameter of the copper-clad steel-cored conductor 10 to 0.038 inch and form a relatively smooth conductor 10.

A well-known, commercially-available electrostatic, fluidized-bed, powder-coating apparatus, designated generally by the numeral 18, obtained from Electrostatic Equipment Corporation of New Haven, Conn. and designated by the supplier as Model Number 900A, is utilized in the performance of methods embodying the present invention, in which a pair of grounded, drawn, copper-clad, steel-cored conductors 10—10 are withdrawn individually from supply stands 19—19 and directed through the apparatus 18 by appropriate means (not shown). The individual, grounded conductors 10—10 pass through the electrostatic, fluidized-bed, coating apparatus 18 in which irregularly-shaped particles 12—12 of unplasticized PVC resin are deposited over approximately 50 percent of the surface of the individual conductors 10—10. The irregularly-shaped particles 12—12 of unplasticized PVC resin are charged and fluidized to form a cloud of particles 12—12 by clean, dry, ionized air of a controlled pressure which is forced through a porous plate (not shown) at the base of the coating chamber in the apparatus 18 at a controlled rate to insure even fluidization. The particles 12—12 in the fluidized bed are maintained at a constant level and the chamber (not shown) is designed to insure that an even and uniform cloud of charged particles 12—12 of PVC resin are maintained in the path of travel of the grounded conductors 10—10.

Prior to the entry of the conductors 10—10 into the electrostatic, fluidized-bed coating apparatus 18, the conductors 10—10 are preheated to a temperature in the range of approximately 650° F. to 675° F. The preheating of the conductors 10—10 may be accomplished by any of a number of conventional preheating facilities, designated generally by the numeral 21, including inductive-resistance heating means. The preheating of the conductors 10—10 is provided to cause melting and controlled degradation of at least the portions of the particles 12—12 of PVC resin contacting the surfaces of the conductors 10—10 and to form the relatively-stable, texturized, discontinuous coating 11 of adhesion sites 12—12 on the conductors 10—10 with interdispersed portions of the surfaces 24—24 of the conductors 10—10 being exposed.

Figure 2:
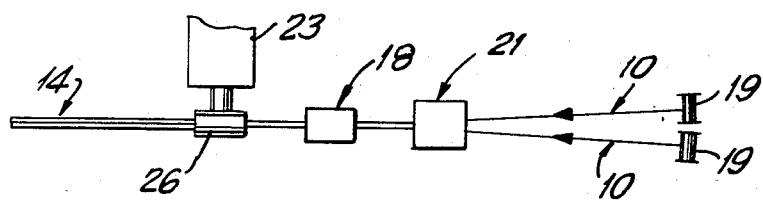
FIG. 2 is a schematic view of apparatus for forming the texturized, discontinuous coating of adhesion sites on the conductors of the drop wire and for applying the insulating composition to the drop wire in accordance with the principles of this invention.

The conductors 10—10 having the relatively-stable, texturized, discontinuous coating 11 of adhesion sites 12—12 thereon are covered with a composition of matter which forms the insulating covering 13. (see FIG. 1) by an extruder, designated generally by the numeral 23, (see FIG. 2). The insulating covering 13 is extruded simultaneously over the spaced, preheated and pre-coated pair of conductors 10—10 to form the drop wire 14.

The drop wire 14 which includes drawn, copper-clad conductors 10—10 covered with the inner discontinuous coating 11 of adhesion sites 12—12 and the outer insulating covering 13 replaces the priorly used drop wire, disclosed and claimed in the E. J. George et al. patent, which also included a relatively-rough, electroformed copper coating on the steel core (not shown).

As explained previously, the drop wire 14 is used to bring telephone service from overhead distribution cables strung between telephone poles (not shown) to subscribers' premises. (not shown). One end of the drop wire 14 is supported from a wedge-shaped clamp (not shown) attached to a pole and then connected to the cable while the other end of the drop wire 14 is supported from a similar clamp attached to the subscriber's home (not shown). From there an electrical connection is made to conductors, which are inside the premises, to the telephone handsets or other subscriber equipment. The drop wire 14 forms generally a caternary between the two wedge-shaped clamps. The load due to the weight of the length of the drop wire 14 in the caternary causes forces to be exerted between the clamps and the ends of the drop wire 14. The clamp engages with the outwardly facing surface of the insulation 13.

It should be apparent that if there is insufficient adhesion between the inwardly facing surface of the insulation 13 and conductors 10—10, the reaction of the clamp on the drop wire 14 could cause the insulation 13 to be pulled there from and the drop wire 14 to be undesirably supported solely by the terminal connections. It follows that the composition as applied to the conductors 10—10 must form a drop wire 14 having at least a sufficient minimum adhesion of the conductor 10 to the insulation 13.

There are also considerations which mitigate against an overly high adhesion between the conductor 10 and the insulation 13. For example, excessive adhesion would render the drop wire 14 extremely difficult to strip during interconnection operations. While overcoming the adhesion to remove the insulation 13, an installer could knick the conductors 10—10. This may affect adversely the electrical properties of the conductors 10—10 as well as penetrate the copper cladding 17 thereby exposing the steel core 16 to possible corrosion. Hence, there is a lower limit of the adhesive bond because of the use to which the drop wire 14 is subjected.

Further, the composition from which the insulation 13 is formed as it is applied to the conductors 10—10 must have requisite physical and electrical properties and must not have undesirable degradation during the processing thereof. For example, the composition of the insulation 13 must be tough, have adequate low temperature flexibility, acceptable resistance to compression, ultra-violet resistance, acceptable weatherability and adequate flame-retardance because of the installation adjacent subscribers' premises. The composition which is used to form the insulating covering 13 includes polyvinyl chloride resin material, a homopolymer, (hereinafter referred to as PVC). The PVC resin has all the characteristics associated with the homopolymer, which includes some abrasion resistance, but which in and of itself is unstable. However, when the PVC resin is caused to soften during processing, which is necessary to process the composition, resistance to abrasion is reduced. Further, the PVC must be a suitable electrical grade homopolymer.

The PVC resin may be any of a number of PVC resins well known in the art for use in electrical insulation. In accordance with the ASTM Standard for 1966, several PVC resins may be classified as within the range of from GP4-00003 to GP6-00003, inclusive. Definition of these characteristics are set forth in the ASTM Standard under designation D1755-66. Briefly, the designation GP designates a general purpose resin. The first numerals (4 through 6) represent a polymer molecular weight in terms of dilute solution viscosity and the last digit 3, indicates the usual preference for electrical conductivity less than 6 ohms per centimeter per gram. This electrical characteristic is, of course, not a basic requirement from the standpoint of the inventive teaching. The four ciphers in the designations indicate that the properties of particle size, apparent bulk density, plasticizer absorption and dry flow may be any ASTM designated level, i.e., 1-9, and, therefore, these properties are not critical for the inventive purposes. It is convenient to discuss concentrations in terms of parts by weight 2 based on 100 parts of the polymeric material. The term polymeric material is defined as the PVC or the total PVC or the total admixed PVC. Concentrations so designated, therefore, result in compositions having greater than 100 parts.

Combined with the PVC homopolymer resin, is a phthalate plasticizer which is included to impart specific physical properties to the composition. The plasticizer provides a suitable degree of low-temperature flexibility to the composition. This is necessary to render the drop wire 14 useable in a wide variety of environmental conditions. The plasticizer also facilitates the processing of the compound in the mixing thereof and in the application to the conductors 10—10. The phthalate plasticizer in a preferred concentration is added to the polyvinyl chloride in about 55-65 parts by weight, per 100 parts by weight of the polymeric material. If less than 55 parts by weight are employed, the composition would have unacceptably low temperature flexing properties. If this constituent is added to the composition in an amount greater than 65 parts by weight per 100 parts by weight of the polymeric material, the electrical properties of the insulation 13 are impaired as is the compressive strength thereof. The insulation 13 becomes softer which is an unacceptable feature of the conductor 14. A suitable phthalate plasticizer is one which is designated Santicizer-711 as marketed by Monsanto.

Combined with the PVC resin and, the phthalate plasticizer, is a stabilizer constituent. The stabilizer is added into the composition in order to provide the composition with heat stability for the composition. A preferred concentration of the metallic stabilizer has been found to be about 3 to 6 parts by weight per 100 parts by weight of the polymeric material. If less than three parts by weight are used, the heat stability of the composition during mixing and at the extruder 23 is reduced with subsequent reduction in processing time. This causes unsatisfactory processing with degraded material being applied to the conductors 10—10. On the other hand, an increase beyond six parts by weight produces slight gains in heat stability at disproportionate increase in composition cost. It has been found that a metallic stabilizer as marketed by Associated Lead, under the designation Tribase E-XL is satisfactory for purposes of this composition.

Combined with the PVC resin, the phthalate stabilizer and the metallic stabilizer is a filler system. The system acts as an extender for the composition. The filler system may include any one of or all of ingredients such as calcium carbonate, fumed silica and a calcined clay. The calcium carbonate, may detract somewhat from the low temperature flexibility of the composition and the impact resistance thereof. In order to diminish this potential adverse effect, the calcium carbonate has been reduced and supplemented by the other above identified fillers. A preferred concentration of the filler system is approximately 5 to 35 parts by weight per 100 parts by weight of the polymeric material. If the filler system constitutes less than 5 parts by weight, the filler system becomes ineffective with the electrical properties of the composition being sacrificed. The lower the filler concentration, the lower the plasticizer concentration and generally the better are the electrical properties. On the other hand, if more than 35 parts by weight of the filler system are used, the low temperature flexibility and impact properties of the composition are affected adversely. While only one of the fillers may be used, it would be advisable to use a combination of the three to obtain optimum physical and electrical properties. At the very least, calcium carbonate should not be used as the sole constituent of the filler system because of the above-mentioned problems. A calcium carbonate suitable for purposes of this composition is manufactured by Harry T. Campbell Sons Company, under the designation Camel-Wite. A suitable fumed silica constituent is one manufactured by the Cabot Corporation under the designation Cab-OSIL MS 7. A suitable calcined clay is SP33 calcined clay marketed by Freeport Kaolin Company.

Combined with the PVC resin, the phthalate plasticizer, the metallic stabilizer, and the filler system is a flame retardant constituent. The flame retardant constituent is necessary to impart adequate flame retardant properties to the drop wire 14 especially since the drop wire 14 is connected to subscriber's premises. The flame retardant constituent also acts as an additional filler to the composition. A suitable flame retardant material is antimony trioxide, pigment grade. It has been found that a preferred concentration of the antimony trioxide is approximately 2 to 4 parts by weight per 100 parts by weight of the polymeric material. Less than two parts reduces the flame retardance of the composition to unacceptably low levels while a concentration in excess of four parts fails to provide a substantial improvement in flame retardance at excessive costs.

Added to the PVC resin, the phthalate plasticizer, the metallic stabilizer, the filler system and the flame retardant constituent, is a carbon black constituent which adds ultraviolet light and weather resistance to the composition as well as providing additional filling properties.

A preferred concentration of the carbon black constituent has been found to be approximately 1 to 3 parts by weight per 100 parts by weight of the polymeric material. Less than one part by weight causes insufficient protection against degradation of the drop wire 14 due to ultra-violet light and heat exposure while greater than three parts by weight are unnecessary to protect the composition against these forces.

The weathering properties of the polyvinyl chloride composition are improved substantially by the inclusion of the carbon black constituent. It has been found that maximum protection is obtained by using a finely divided furnace black with high electrical resistivity. The carbon black must be well dispersed throughout the composition in order to be most effective. It has been found that a suitable carbon black material for use in this composition is one designated Mogul L, as manufactured by Cabot Corporation.

EXAMPLES

The following examples illustrate various compositions which may be applied to the precoated smooth, drawn, copper-clad conductors 10—10 in accordance with the principles of this invention to produce plastic covered drop wires 14—14. The examples are set forth in tabular form. For comparison purposes, in all examples set forth the amounts are in parts by weight per 100 parts by weight of the PVC homopolymer.

TABLE I

| RANGES | CONSTITUENT | EXAMPLES A | B | C |
|---|---|---|---|---|
| 100 | PVC RESIN | 100 | 100 | 100 |
| 55–65 | PHTHALATE PLASTICIZER | 62.0 | 55 | 65 |
| 3–6 | METALLIC STABILIZER | 5 | 6 | 3 |
| 5–35 | FILLER | | | |
| | CaCO$_3$ | 0 | 5 | 10 |
| | fumed silica | 2.5 | 5 | 5 |
| | calcined clay | 7.5 | 5 | 10 |
| 2–4 | ANTIMONY TRIOXIDE | 3 | 2 | 4 |
| 1–3 | CARBON BLACK | 2.5 | 1 | 3 |

All of the example compositions of Table I when applied to the conductors 10—10 in accordance with the teaching of the present inventions will result in plastic-covered drop wire 14—14 having the required degree of adhesion of the composition to the conductors 10—10 and other required physical characteristics.

METHODS OF APPLYING THE COMPOSITION

The principles of the methods of this invention are used to apply the composition to the metallic, strand conductors 10—10 which have been previously coated with the partially degradated particles 12—12 of unplasticized PVC adhering thereto to form the relatively-stable, texturized, discontinuous coating 11 of adhesion sites 12—12 on the surfaces of the conductors 10—10 by the conventional extruder 23.

The extrusion process is controlled so that there is an optimum adhesion between the adhesion sites 12 12 and the interdispersed exposed surfaces 24—24 of the conductors 10—10 and the composition when the composition cools to room temperature to form the insulating covering 13. This must be determined from a consideration of several factors.

A certain value of permanent adhesion of the insulating covering 13 to the adhesion sites 12—12 and the exposed surfaces 24—24 of the conductors 10—10 is necessary in the environment of the clamp (not shown) used for supporting one end of the drop wire 14 adjacent the subscriber's premises. An adhesion of the insulating covering 13 to each of the adhesion sites 12—12 and the exposed surfaces 24—24 of the conductors 10—10, in the neighborhood of approximately 20-25 pounds, is preferred with limits of 8-32 pounds being permitted. If the adhesion of the insulating covering 13 to the adhesion sites 12—12 and the exposed surfaces 24—24 of each conductor 10 is less than 8 pounds, then the clamp may cause the insulation 13 to pull away from the conductor 10. On the other hand, if the adhesion is greater than approximately 32 pounds, then it becomes very difficult to strip the insulation 13 from the conductors 10—10. In that event it is possible that an installer could inadvertently scrape the conductors 10—10 thereby increasing the electrical resistance and changing the conductivity of the conductors 10—10. This could also result undesirably in an exposure of the steel core 16.

The alternatives to the methods of forming a single layer plastic composition drop wire as disclosed and claimed in the E. J. George et al. patent were considered and tried. In order to obtain a desired degree of adhesion on the relatively-smooth surface of the drawn, copper-clad, steel-cored conductor 10, a precoat of an adhesive material on the outwardly facing surface of the conductors 10—10 was used but satisfactory results were not obtained.

In practicing the methods embodying the principles of this invention, a pair of relatively-smooth, drawn, copper-clad, steel-cored conductors 10—10 are advanced along a manufacturing line in spaced, parallel relationship to be enclosed in a plastic insulating covering 13. The composition of the covering 13 is to be applied to the conductors 10—10 as they are advanced through a dual passageway core tube (not shown) of the extruder 23. In the process of preparing the composition forming the covering 13 for application to the conductors 10—10 in accordance with the principles of this invention, the PVC and other compounding ingredients heretofore disclosed are fed through a hopper (not shown) and a feed port (not shown) into the extruder 23. The composition is then admitted to the extruder barrel which has been preheated to a temperature slightly above the softening point of the polymers, typically in the range of 325° F. to 375° F., wherein it is thoroughly worked and fed along by the screw of the extruder 23. Temperatures may vary from the softening point of the PVC composition to the decomposition temperature thereof, permitting wide latitude in the selection of operating conditions. Further, the process is independent of the time in the extruder 23 and practical consideration dictates selection of specific temperatures.

An extruder screw (not shown) is driven to move the PVC composition from the feed port through the barrel, which is heated by electric resistance heaters (not shown). During this period of time, the mixture is formed into intimate and substantially sliding contact with the barrel walls and is also sheared and worked. The combined effects of the heated barrel and the heat due to internal friction in the material causes the thermal plastic mass to be molten by the time it has traveled approximately one-fourth of the length of the extruder barrel. The molten mixture then continues through the barrel and proceeds toward the breaker plate which restricts its flow and creates back pressure. The molten composition is forced through a breaker plate assembly (not shown) and then conducted to the wire guide core tube which is shaped so that the composition flows around either side of it and joins again on the side remote from the supply. The complete annulus of material then flows toward a die and ultimately toward engagement with the conductors 10—10 passing through the die. It will be recalled that a definite preheat has been imparted to the conductors 10—10 which are moved continuously through the die in the crosshead, designated generally by the numeral 26. In this way, the composition is extruded over the preheated and precoated conductors 10—10 which are moved continuously through the die in the crosshead 26 and which acts as an internal forming mandrel.

The composition for producing the plastic, insulating covering 13 for the drop wire 14 and the drop wire 14 produced thereby must possess specified properties, some of which have been described hereinbefore. The following table, Table II, indicates the preferred operating conditions of the fluidized-bed, coating operation, the inherent viscosity of the unplasticized PVC resin particles and the properties of drop wire 14 insulated with a preferred composition, designated Example A in Table I.

TABLE II

TEST RESULTS FOR EXAMPLE A

| Conductor Preheat Temp - (F.°) | Voltage of Fluidized Bed - (KV) | Flow of Air - Standard Cu. Ft/Hr | Unplasticized PVC Resin - Inherent Viscosity | Adhesion to Conductor - Pounds Force |
|---|---|---|---|---|
| 600 | 35–38 | 350–400 | .76 | 0–10 |
| 650–675* | 35–38* | 350–400* | .7–.9* | 20–25* |
| 650–675 | 25–30 | 350–400 | .76 | 5–10 |
| 650–675 | 35–38 | 200 | .76 | 18–20 |
| 650–675 | 35–38 | 350–400 | .50 | 30–35 |
| 650–675 | 35–38 | 350–400 | 1.0 | 15–20 |
| 650–675 | 35–38 | 500 | .76 | 25–30 |
| 650–675 | 40–42 | 350–400 | .76 | 30–40 |
| 725 | 35–38 | 350–400 | .76 | 0 |

| PROPERTY | |
|---|---|
| Compressive Strength | 1000 to 1100 lbs. |
| Elongation | In excess of 300% |
| Insulation resistance | 300–5000 megaohms - 1000 ft. corrected to 60° F. |
| Mutual Capacitance | 0.040 microfarads per 1000 feet |
| Clamp Holding Test | Satisfactory |

*PREFERRED

Figure 3:
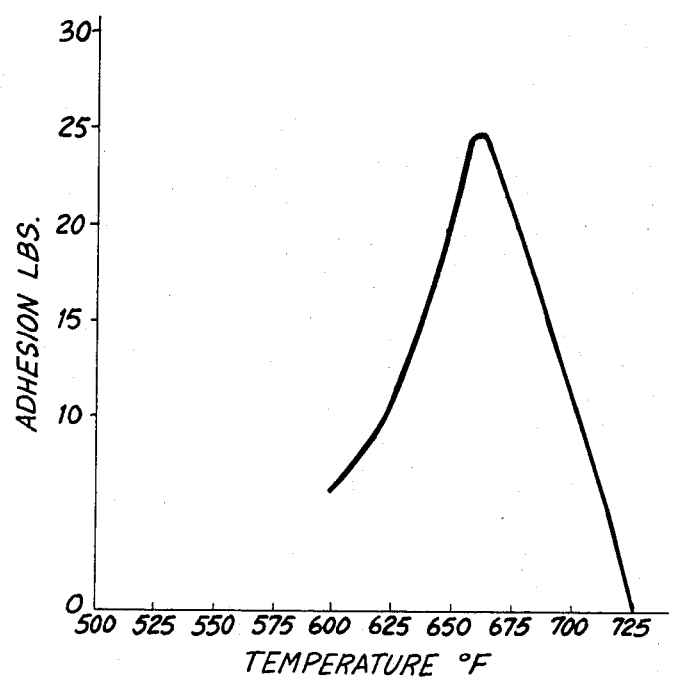
FIG. 3 is a graph using Cartesian coordinates and showing a critical range of temperatures for achieving an optimum range of adhesion values.

A plot of the adhesion values of each conductor 10 to the insulating covering 13 is shown in FIG. 3. Referring now to FIG. 3, it can be seen that the adhesion of the insulating covering 13 to the conductor 10 varies with respect to preheat temperatures. Not only is there a critical lower limit below which the adhesion values of each conductor 10 to the insulating covering 13, as shown in FIG. 3, may be unacceptably low, but there is also an upper limit of temperature beyond which a decrease in adhesion values occurs. The temperature reading to which the adhesion values shown in FIG. 3 and in the Table II were taken at the preheater 21 just prior to the conductors 10—10 being coated in the apparatus 18 and then entering the extruder 23 with a line speed of approximately 590 feet per minute.

In order to test the adhesion of the insulating covering 13 to the conductors 10—10, the plastic-covered drop wire 14 is subjected to what is referred to as a slip-off test. A portion of the drop wire 14 having a length of approximately 6 inches is split along the longitudinal centerline thereof to form two individual, insulated conductors 10—10. A circumferential cut of the insulation 13 is made 4 inches from the end of each of the two conductors 10—10, a distance of three-eighths inch is measured off toward the other end, and the conductor 10 is severed. In this way, conductors 4⅜ inches in length with three-eighths inch of insulation 13 on one end thereof are formed. The bared portion of the conductor 10 is clamped in a moveable test head (not shown) to move the bared portion through measured orifice (not shown) having a diameter of the bared conductor 10. The force applied parallel to the axis of the conductor 10 and sufficient to pull the ⅜ inch length of insulation 13 from the other end of the conductor 10, is measured. The applied force at which the insulation 13 is "popped off" the conductor 10 is recorded and is determined to be the magnitude of the adhesion of the insulating covering 13 to the conductor 10.

It should be observed from FIG. 3 that with a conductor 10 preheat temperature of above approximately 675° F., the adhesion of the insulation 13 of the conductor 10 decreases. Apparently, conductor 10 preheat temperatures in excess of 675° F. causes excessive degradation and causes the bonding process hereinbefore described to become less effective. If the precoated particles 12—12 of the unplasticized PVC resin is subjected to the excessive heat upon engaging the conductor 10, the degradation of the particles 12—12 is excessive and the bond between the conductor 10 and the particles 12—12, and thus the bond between the adhesion sites 12—12 and the insulating covering 13 can be insufficient. The drop wire 14 is also subjected to a compression test wherein it must withstand an 850 pound minimum crushing load. The insulation 13 must also conform to specific elongation requirements. Any length of insulation 13 removed from the drop wire 14 must be such that the elongation at break shall be 250% minimum when tested in accordance with ASTM D 470, except that the test temperature shall be 73.4±2° F.

The drop wire 14 must also meet specific low temperature flexibility requirements. A sample of the drop wire 14 is wound flatwise around a test mandrel (not shown) having a maximum diameter of three-eighths inch at a temperature of −30°±2° F. without cracking of the insulation 13. The mandrel and the sample must be maintained at the test temperature for not less than 4 hours prior to the test.

Another important test is a so-called static load or clamp holding test. A sample of the drop wire 14 is held between two of the clamps (not shown) and subjected to a dead weight tension load of 290 pounds minimum for a minimum time of 24 hours without rupture of the insulation 13. After the load has been removed, the drop wire 14 shall withstand 10,000 volts (rms) minimum for five seconds between conductors and each one of the clamps.

Acceptable drop wire 14 shall also withstand an impact test without disclosing cracks in the insulation 13. With a test fixture and specimen at a test temperature of −20°±2° F. for a minimum of 4 hours, a weight (not shown) is released in a guideway (not shown) at a height to provide a minimum specified gravitational potential energy to impact the surface of the drop wire 14.

Depending upon the particle size and/or diffusion properties desired, the unplasticized PVC precoating material may be a general purpose homopolymer of the type described above for use for the insulating compound and covered by above identified 1966 ASTM Standard or may be dispersion-type or blending-type PVC resins.

The precoating plastic material or basic material used in the final coating compound may for example be a vinyl chloride copolymer, such as vinyl chloride vinyl acetate copolymer.

It is to be understood that the above described arrangements are simply illustrative of the invention. Other arrangements may be devised by those skilled in the art which will embody the principles of the invention to fall within the spirit and scope thereof.

What is claimed is:

1. The method of forming a relatively-stable, texturized, discontinuous coating of adhesion sites on at least a portion of the surface of a metallic member to be coated which includes the steps of coating the portion of the surface of the metallic member to be coated with particles of unplasticized plastic material, and heating the particles of unplasticized plastic material for a time and at a temperature sufficient to melt the portions of the particles contacting the metallic member to cause the portions of the particles to undergo controlled degradation and to adhere to the surface of the metallic member, and thus to form a relatively stable, texturized, discontinuous coating of adhesion sites on the desired portion of the surface of the metallic member and applying a coating of a molten composition of plasticized plastic to the discontinuous coating.

2. The method of forming a relatively-stable, texturized, discontinuous coating of adhesion sites on at least a portion of the surface of a metallic member to be coated which includes the steps of coating the portion of the surface of the metallic member to be coated with particles of unplasticized PVC material, and heating the portions of the particles contacting the metallic member for a time and at a temperature sufficient to melt the portions of the particles contacting the metallic member, to cause the portions of the particles to undergo controlled degradation and to adhere to the surface of the metallic member, and thus to form a relatively-stable, texturized, discontinuous coating of adhesion sites on the desired portion of the surface of the metallic member and applying a coat of a molten composition of plasticized plastic to the discontinuous coating.

3. The method of forming a relatively-stable, texturized, discontinuous coating of adhesion sites on at least a portion of the surface of a conductor to be coated which includes the steps of preheating the conductor to a temperature within a temperature range of approximately 650° F. to 675° F., coating the portion of the surface of the preheated conductor to be coated with particles of unplasticized PVC material and using the heat in the preheated conductor for heating the portions of the particles of unplasticized PVC material contacting the surface of the conductor for a time and at a temperature sufficient to cause the portions of particles contacting the surface of the conductor to melt, to undergo controlled degradation and to adhere to the surface of the conductor, and thus to form a relatively-stable, texturized, discontinuous coating of adhesion sites on the desired portion of the surface of the conductor and applying a coating of a molten composition of plasticized plastic to the discontinuous coating.

4. The method of forming an adherent plastic coating on the surface of a metallic member which includes the steps of coating at least the portion of the surface of the metallic member to be coated with particles of unplasticized PVC material, heating the particles of PVC material to a temperature and for a time sufficient to cause the portions of the particles of unplasticized PVC material contacting the surface of the metallic member to melt, to undergo controlled degradation and to adhere to the surface of the member, and thus to form a relatively stable, texturized, discontinuous coating of adhesion sites on the portion of the surface of the metallic member to be coated and interdispersed exposed portions of the surface of the metallic member being exposed; and applying a coating of a molten composition of plasticized PVC material to the discontinuous coating of adhesion sites and interdispersed portions while maintaining the temperature at the interface between the adhesion sites and exposed portions and the coating of molten composition of plasticized PVC material, as a result of the combined heat applied to coated particles of unplasticized PVC material and the heat of the molten composition of plasticized PVC material, sufficient to cause the composition containing the plasticized PVC material to develop a relatively-stable, controlled adhesive bond with the adhesion sites and the interdispersed, exposed portions of the surface of the metallic member being coated.

5. The method of forming an adherent plastic coating on the surface of an elongated conductor which includes the steps of coating the portion of the surface of the conductor to be coated with particles of unplasticized PVC material, preheating the conductor to a temperature in a range of approximately 650° F. to 675° F., then heating the portions of the particles of PVC material contacting the surface of the conductor to be coated by the use of the heat in the preheated conductor to a temperature and for a time sufficient to cause the portions of the particles of unplasticized PVC material contacting the surface of the conductor to melt, to undergo controlled degradation and to adhere to the surface of the conductor, and thus to form a relatively-stable, texturized, discontinuos coating of adhesion sites over approximately 50 percent of the surface of the conductor while interdispersed portions of the remaining approximately 50 percent of the surface of the conductor remain exposed; and applying a coating of a molten composition of plasticized PVC material to the precoated conductor while maintaining the temperature at the interface between the adhesion sites and the molten composition of plasticized PVC material, as a result of the combined heat in the preheated conductor and the heat of the molten composition of PVC sufficient to cause composition containing the plasticized PVC material to develop a relatively-stable, controlled adhesive bond with the adhesion sites and the interdispersed, exposed portions of the surface of the metallic member being coated.

6. The method of forming an adherent, plastic, insulating coating on the surface of at least a pair of elongated conductors which includes the steps of preheating the conductors to a temperature in a range of approximately 650° F. to 675° F., coating the portions of the surfaces of the preheated conductors to be coated with spaced particles of unplasticized PVC material then using the heat in the preheated conductors to cause the portions of the particles of unplasticized PVC material, contacting the surfaces of the preheated conductors to melt, to undergo controlled degradation and to adhere to the surfaces of the conductors, and thus to form a relatively-stable, texturized, discontinous coating of adhesion sites on the surfaces of the conductors and having interdispersed portions of surfaces of the conductors exposed; and applying a coating of a molten composition of plasticized PVC material while maintaining the temperature at the interface between adhesion sites and the coating of the molten composition of plasticized PVC material, as a result of the combined heat in the preheated conductors and the heat of the molten composition of plasticized PVC material, sufficient to cause the composition containing the plasticized PVC material to develop a relatively-stable, controlled bonds with the adhesion sites and the interdispersed, exposed portions of the surfaces of the conductors being coated.

7. The method of making insulated wire which comprises the step of supplying indefinite lengths of conductors, preheating the conductors to a predetermined temperature within a specific range of approximately 650° F. to 675° F., generating a cloud of electrostatically-charged particles of unplasticized plastic material, advancing the preheated conductors in close proximity with the cloud of electrostatically-charged particles of unplasticized plastic material, maintaining said conductors at a relative potential with respect to the charged particles of unplasticized plastic material to cause the particles to deposit on and adhere to approximately 50 percent of the surfaces of the conductors in relatively spaced relationships with respect to each other, and simultaneously, as a result of the heat in the preheated conductors, causing the portions of the particles of unplasticized plastic material contacting the surfaces on the conductors to melt, to undergo controlled degradation and to adhere to the surfaces of the conductors, and thus to form relatively stable, texturized discontinuous coatings of adhesion sites over approximately 50 percent of the surfaces of the conductors, while leaving thee interdispersed portions of the remaining approximately 50 percent of the surfaces of the conductors exposed; and extruding a composition containing plasticized plastic material over the precoated conductors while maintaining the conductors in predetermined spaced relationship to form an insulating covering while maintaining the temperature of the conductors substantially within the specified temperature range of approximately 650° F. to 675° F., the temperature being sufficient to develop an unexpectedly-superior, relatively-stable, controlled, adhesive bond with the adhesion sites and the interdispersed exposed portions of the surfaces of the conductors, the magnitude of the temperature to which the conductors are preheated effecting the magnitude of the adhesive bond and the magnitude of the adhesive bond being controlled to be consistently within a specified range so that relative movement of the insulating covering axially of the conductors under predetermined stresses is prevented.

8. The method of making insulated wire which comprises the steps of supplying an indefinite length of conductor, preheating the conductor to a predetermined temperature within a specific range of approximately 650° F. to 675° F., generating a cloud of irregularly-shaped, electrostatically-charged particles of unplasticized PVC resin, advancing the preheated conductor through the cloud of electrostatically-charged particles of unplasticized PVC resin to cause the particles to deposit on and adhere to the surface of the conductor in relatively spaced relationships with respect to each other, and simultaneously, as a result of the heat in the preheated conductor, causing the portions of the particles of unplasticized PVC resin which contact the conductor to melt, to undergo controlled degradation and to adhere to the surface of the conductor and thus to form relatively-stable, texturized, discontinuous coatings of adhesion sites on the conductor while leaving interdispersed portions of the surface of the conductor exposed; and extruding a composition containing plasticized PVC resin over the precoated conductor to form an insulating covering, while maintaining the temperature thereof substantially within the specified temperature range of approximately 650° F. to 675° F., the temperature being sufficient to develop an unexpectedly-superior, relatively-stable, controlled, adhesive bond with the adhesion sites and the interdispersed exposed portions of the surface of the conductor, the magnitude of the temperatures effecting the magnitude of the adhesive bond and the magnitude of the adhesive bond being controlled to be consistently within a specified range so that relative movement of the insulating covering axially of the conductor under predetermined stresses is prevented.

9. The method of making insulated wire which comprises the steps of supplying indefinite lengths of drawn, copper-clad steel-cored conductors of approximately 0.038 inch in diameter; preheating the conductors to a predetermined temperature within a specific temperature range of approximately 650° F. to 675° F.; utilizing ionized air flowing at approximately 350–400 standard cubic feets/per hour and being charged at approximately 35–38 kilovolts to fluidize and to generate a cloud of irregularly-shaped, electrostatically-charged particles of unplasticized PVC resin approximately 75 microns in size, and having an inherent viscosity of approximately 0.7 to 0.9; advancing the preheated conductors through the cloud of electrostatically-charged particles of unplasticized PVC resin at approximately 575–600 ft. per minute; maintaining said conductors at a relative potential with respect to the charged particles of unplasticized PVC resin to cause the particles of unplasticized PVC resin to deposit on and adhere to approximately 50 percent of the surfaces of the conductors in relatively spaced relationships with respect to each other; simultaneously, as a result of the heat in the preheated conductors, causing the portions of the particles of unplasticized PVC resin, contacting the conductors to melt, to undergo controlled degradation and to adhere to the surfaces of the conductors, and thus to form relatively-stable, texturized, discontinuous coatings of adhesion sites on approximately 50 percent of the surfaces of the conductors while leaving interdispersed surfaces over the remaining approximately 50 percent of the surface of the conductor exposed; and extruding a composition containing plasticized PVC resin over the conductors to form an insulating covering while maintaining the conductors in predetermined spaced relationship and while maintaining the temperature thereof substantially within the speciffied temperature range of approximately 650° F. to 675° F., the temperature being sufficient to develop an unexpectedly-superior, relatively-stable, controlled, adhesive bond with the adhesion sites and the interdispersed exposed portions of the surfaces of the conductors, the magnitude of the adhesive bond being controlled to be consistently within a range of approximately 20 to 25 pounds force so that relative movement of the insulating covering axially of the conductors within predetermined stresses is prevented.

10. The method of a making insulated conductor which comprises the steps of supplying indefinite length of conductor, preheating the conductor to a predetermined temperature within a specific temperature range of approximately 650° F. to 675° F., generating a cloud of irregularly-shaped, electrostatically-charged particles of unplasticized PVC resin, advancing the preheated conductor through the cloud of electrostatically-charged particles of unplasticized PVC resin, maintaining said conductor at a relative potential with respect to the charged particles of unplasticized PVC resin to cause the particles to deposit on and adhere to the surface of the conductor, and simultaneously, as a result of the heat in the preheated conductor, causing the portions of the particles of unplasticized PVC resin contacting the conductor to melt, to undergo controlled degradation and to adhere to the surface of the conductor, and thus to form relatively stable, texturized, discontinuous coatings of adhesion sites on the conductor while leaving interdispersed portions of the surface of the conductor exposed; and extruding an insulating covering composition containing plasticized PVC resin over the conductor while the temperature thereof is substantially within the specified temperature range of approximately 650° F. to 675° F., the temperature being sufficient to develop an unexpectedly-superior, relatively-stable, controlled, adhesive bond with the adhesion sites and the interdispersed exposed portions of the surface of the conductor, the magnitude of the adhesive bond being controlled to be consistently within a specified range so that relative movement of the insulating coating axially of the conductor under predetermined stresses is prevented.

11. The method of forming an adherent, plastic coating on the surface of a metallic member which includes the steps of coating at least the portion of the surface of the metallic member to be coated with particles of unplasticized plastic material, heating the particles of plastic material on at least the portion of the surface of the metallic member to be coated to a temperature and for a time sufficient to cause the portions of the particles of unplasticized plastic material contacting the surface of the member to melt, to undergo controlled degradation and to adhere to the surface of the member, and thus to form a relatively stable, texturized, discontinuous coating of adhesion sites on the portion of the surface of the metallic member to be coated while leaving interdispersed portions of the surface of the member exposed; and applying a coating of a molten composition containing the plasticized plastic material while maintaining the temperature at the interface between adhesion sites and the coating of molten composition, as a result of the combined heat applied to coated particles and the heat of the molten composition, sufficient to cause the composition to develop a relatively-stable, controlled adhesive bond with the adhesion sites and the interdispersed, exposed portions of the surface of the metallic member being coated.

* * * * *